(No Model.)
L. T. NICHOLS & H. E. SKEELS.
HAY LOADER.
No. 580,705. Patented Apr. 13, 1897.
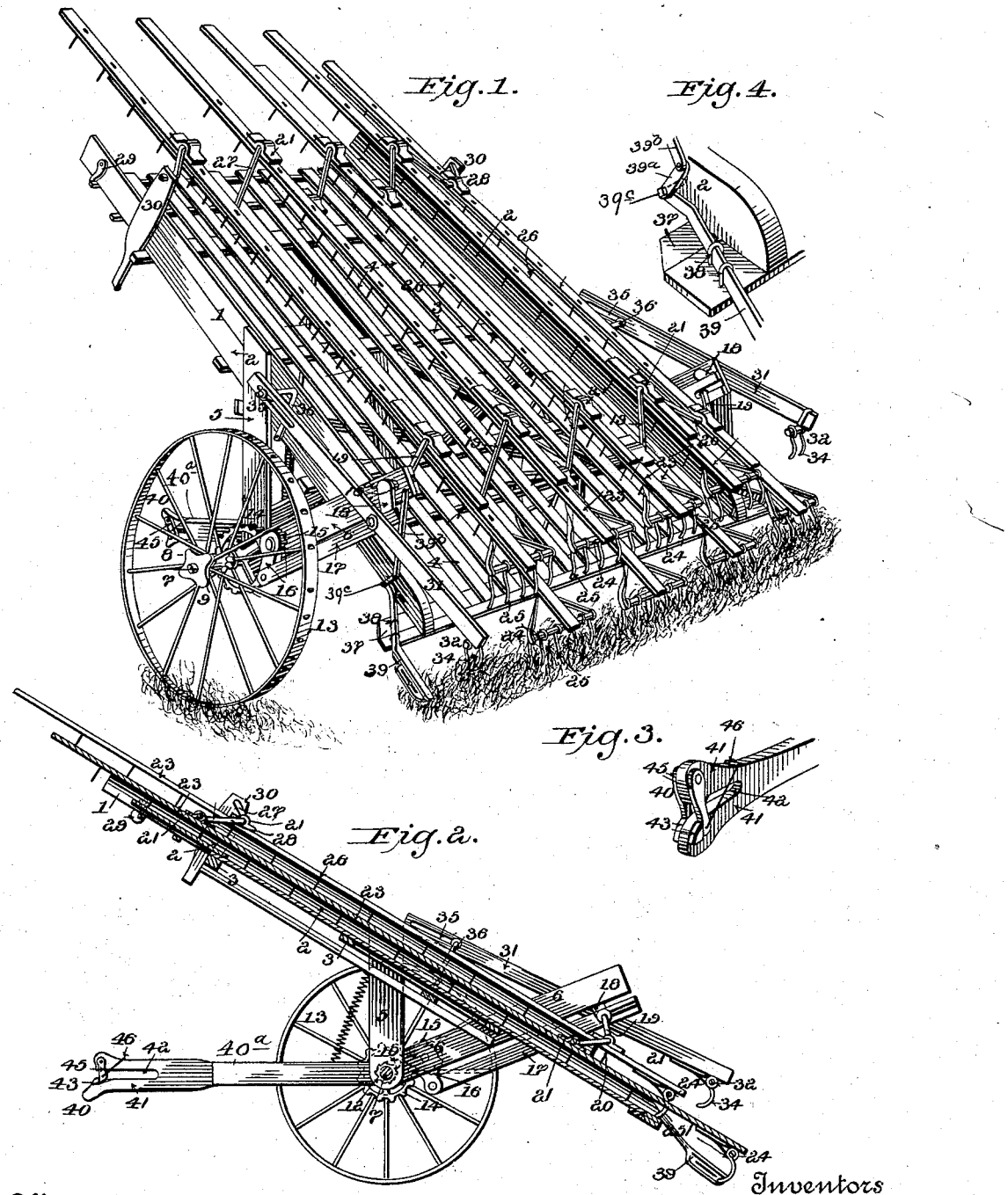

UNITED STATES PATENT OFFICE.

L T NICHOLS AND HENRY E. SKEELS, OF WEST CONCORD, MINNESOTA.

HAY-LOADER.

SPECIFICATION forming part of Letters Patent No. 580,705, dated April 13, 1897.

Application filed November 6, 1894. Serial No. 528,040. (No model.)

*To all whom it may concern:*

Be it known that we, L T NICHOLS and HENRY E. SKEELS, citizens of the United States, residing at West Concord, in the county of Dodge and State of Minnesota, have invented certain new and useful Improvements in Hay-Loaders; and we do hereby declare the following to be a full, clear, and exact description of the invention, such as will enable others skilled in the art to which it appertains to make and use the same.

Our invention relates to hay-loaders of that character or description known as "walking loaders," and its object is to provide an improved construction of the same which shall possess superior advantages with respect to efficiency in operation.

The invention consists in the novel construction and combination of parts hereinafter fully described and claimed.

In the accompanying drawings, Figure 1 is a perspective view of a hay-loader constructed according to our invention. Fig. 2 is a central vertical section of the same. Fig. 3 is a detail perspective view of the tongue-head with which a clevis on a hay-wagon engages. Fig. 4 is a detail perspective of the upper end of inclined shoes and lower end of side bars, showing engagement with socket.

In the said drawings, the reference-numeral 1 designates an inclined frame consisting of side-boards 2, cross-bars 3, and slats 4, forming the bottom. Secured to said side-boards 2 are vertical bars 5 and rearwardly-extending inclined bars 6, secured together at their lower ends. Passing through bearings secured to lower ends of said vertical bars is the axle 7, having at each end a plate 8, formed with radial arms 9, carrying spring-actuated pawls or dogs 10, which engage with ratchet-wheels 12, secured to the wheels 13. Secured to the axle near each end is a cog or spur wheel 14, which meshes with pinions 15, journaled on stud-shafts secured to the inclined bars 6. These pinions are provided with cranks 16, to which are journaled rearwardly-extending pitmen 17, which in turn are pivoted to cranks 18, secured to the journals 18$^a$ of a transverse crank-shaft 19. This shaft is of peculiar construction, consisting of metal rods bent intermediate their ends to form a series of oppositely-extending cranks 20, and their ends bent outwardly to form the journals 20, which work in bearings 21. Pivoted to these alternately-arranged oppositely-extending cranks are inclined rake-bars 23, provided at their lower ends with rake-heads 24, to which are secured the curved rake-teeth 25. The under sides of the rake at suitable points throughout their length are provided with downwardly-extending pins 26. Near their upper ends the said rake-bars are pivoted to a double-crank shaft 27, similar to the shaft before described—that is to say, formed with alternately-arranged oppositely-extending cranks 28.

The numeral 29 designates hooks for engaging with a hay-wagon, and the numeral 30 bars in which the shaft 27 is journaled.

Pivotally connected with each of the cranks 18 is a clearer-rake bar 31, provided at its lower end with a rake-head 32, provided with teeth 34. At their upper ends these bars are formed with elongated slots 35, with which engage guide-rods 36, secured to the side bars 2. The object of these rakes is to clear away the hay at the sides of the machine and prevent its clogging the gearing which operates the rakes connected with the crank-shafts.

Secured to the lower ends of the side-boards 2 is a cross-board 37, provided at each end with staples 38 to receive the inner ends of inclined shoes 39, which travel on the ground and serve to support the lower end of the platform. The inner ends of these shoes are secured to links 39$^a$ by bolts 39$^c$, which links in turn are secured to the upwardly-extending arms 39$^b$, secured to boards 6, and which serve to prevent any hay falling off the sides of the machine as it is carried up by the clearers. The links are pivotally connected with the shoes and arms 39$^a$, and by loosening the staples and the bolts 39$^c$ the shoes may be moved in and out in order to vary the height of the frame from the ground. By again tightening said bolts and driving in the staples the shoes will be held in their adjusted positions.

The numeral 40$^a$ designates the tongue of the machine, provided with a head 40 and two rearwardly-extending parallel arms 41, which are connected with the axle. The head 40 is recessed to form a chamber 42, having two lugs 43, which form stops for pivoted dogs 45, to which is connected a rope 46, leading to the wagon-platform. The object of this construction is to provide means for coupling the loader to a hay-wagon. The rear end of the wagon is provided with an ordinary clevis or link, which, when the wagon is backed toward the loader, engages in the chamber in the head 40, pushing back the dogs until it clears the same. The dogs will then drop down and their free ends engage with the stop-lugs, and thus couple the loader to the wagon. By pulling upon the rope the dogs can be disengaged or lifted up, so that the link can be withdrawn when it is desired to disconnect the loader.

The operation will be readily understood. As the wagon is drawn forward the dogs of the axle-plates will be engaged by the ratchets of the wheels whereby the axle is rotated, and through the medium of the cog-wheels, pinions, and pitman the lower crank-shaft will be rotated. By the construction of the crank-shafts as described, with two oppositely-extending alternately-arranged series of cranks, as one set of rakes is depressed and drawn inwardly, carrying the hay toward the frame, the other set of rakes is elevated, disengaging them from the hay previously raked onto the frame, and moved outwardly to gather a fresh supply. This operation is alternately repeated, the inwardly-moving rakes in connection with the pins on the rake-bar moving the hay up on the frame to the platform of the wagon.

Having thus fully described our invention, what we claim is—

1. In a hay-loader, the combination with the elevator body or frame, a crank-shaft located adjacent to the lower end of the frame, elevator-arms connected with and adapted to be operated by said crank-shaft and corner-cleaning devices also connected with and adapted to be operated by said crank-shaft, substantially as described.

2. In a hay-loader, the combination with the frame, the shafts at each end thereof, formed with two sets of oppositely-extending cranks and the rakes connected therewith, of the cranks secured to the lower shaft, the pitmen, the pinions and cranks, the cog-wheels, the clearers pivotally connected with the cranks on the ends of the crank-shafts, the rake-teeth secured thereto and the guide-rods working in slots in the upper ends of said clearers, substantially as described.

In testimony whereof we affix our signatures in presence of two witnesses.

L T NICHOLS.
HENRY E. SKEELS.

Witnesses:
C. M. ROUND,
M. M. SEVERNS.